US012400849B2

(12) United States Patent
Takahashi

(10) Patent No.: US 12,400,849 B2
(45) **Date of Patent: *Aug. 26, 2025**

(54) PLASMA GENERATING DEVICE

(71) Applicant: ATONARP INC., Tokyo (JP)

(72) Inventor: Naoki Takahashi, Tokyo (JP)

(73) Assignee: ATONARP INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,131

(22) Filed: Apr. 15, 2024

(65) Prior Publication Data

US 2024/0258092 A1 Aug. 1, 2024

Related U.S. Application Data

(63) Continuation of application No. 17/912,226, filed as application No. PCT/JP2021/013168 on Mar. 29, 2021, now Pat. No. 11,996,278.

(30) Foreign Application Priority Data

Mar. 31, 2020 (JP) ................................ 2020-062862

(51) Int. Cl.
*H01J 49/10* (2006.01)
*H01J 49/42* (2006.01)
*H05H 1/30* (2006.01)

(52) U.S. Cl.
CPC ............ *H01J 49/105* (2013.01); *H05H 1/30* (2013.01); *H01J 49/4215* (2013.01)

(58) Field of Classification Search
CPC ....... H01J 49/105; H01J 49/4215; H05H 1/30
See application file for complete search history.

(56) References Cited

U.S. PATENT DOCUMENTS 5,068,534 A 11/1991 Bradshaw et al.
5,650,618 A 7/1997 Tuszewski
(Continued)

FOREIGN PATENT DOCUMENTS

JP H09265937 A 10/1997
JP H10199473 A 7/1998
(Continued)

OTHER PUBLICATIONS

English Translation of International Preliminary Report on Patentability (PCT/IB/373) and Written Opinion (PCT/ISA/237) mailed on Sep. 29, 2022, by the International Bureau of WIPO for International Application No. PCT/JP2021/013168.
(Continued)

*Primary Examiner* — Wyatt A Stoffa
*Assistant Examiner* — Hanway Chang
(74) *Attorney, Agent, or Firm* — Buchanan Ingersoll & Rooney PC

(57) ABSTRACT

A plasma generating device includes: a chamber which is equipped with a dielectric wall structure and into which sample gas to be measured flows; an RF supplying mechanism that generates plasma inside the chamber using an electric field and/or a magnetic field through the dielectric wall structure; and a floating potential supplying mechanism that includes a first electrode disposed along an inner surface of the chamber. The RF supplying mechanism may include an RF field forming unit disposed in a first direction with respect to the chamber and the first electrode may include an electrode disposed in a second direction with respect to the chamber.

12 Claims, 3 Drawing Sheets

(56) References Cited

U.S. PATENT DOCUMENTS

| | | | | |
|---|---|---|---|---|
| 11,996,278 | B2 * | 5/2024 | Takahashi ................ | H05H 1/30 |
| 12,078,611 | B2 * | 9/2024 | Takahashi ............... | H01J 49/04 |
| 2005/0195393 | A1 | 9/2005 | Karanassios | |
| 2017/0194157 | A1 | 7/2017 | Ishiguro et al. | |
| 2019/0011400 | A1 | 1/2019 | Nacson | |
| 2023/0187195 | A1 | 6/2023 | Takahashi | |

FOREIGN PATENT DOCUMENTS

| | | | |
|---|---|---|---|
| JP | 2006049922 | A | 2/2006 |
| JP | 2011249289 | A | 12/2011 |
| JP | 2013161694 | A | 8/2013 |
| JP | 2015162267 | A | 9/2015 |
| JP | 2015204418 | A | 11/2015 |

OTHER PUBLICATIONS

International Search Report (PCT/ISA/210) with translation and Written Opinion (PCT/ISA/237) mailed on Jun. 22, 2021, by the Japan Patent Office as the International Searching Authority for International Application No. PCT/JP2021/013168.

The extended European Search Report issued on Apr. 15, 2024, by the European Patent Office in corresponding European Application No. 21780358.4. (9 pages).

* cited by examiner

PLASMA GENERATING DEVICE

CROSS REFERENCE TO RELATED APPLICATIONS

The present application is a continuation of U.S. patent application Ser. No. 17/912,226, filed on Sep. 16, 2022, which is a national stage application of PCT/JP2021/0131688, filed on Mar. 29, 2021, which claims priority to Japanese Patent Application No. 2020-062862, filed on Mar. 31, 2020. The entire contents of U.S. patent application Ser. No. 17/912,226, PCT/JP2021/0131688 and Japanese Patent Application No. 2020-062862 are incorporated herein by reference.

TECHNICAL FIELD

The present invention relates to a plasma generating device with a chamber in which microplasma is generated.

BACKGROUND ART

Japanese Laid-open Patent Publication No. 2015-204418 discloses a plasma processing apparatus comprising: a reaction chamber containing a reaction gas; a plasma generation unit that converts the reaction gas inside the reaction chamber into plasma; an electrode that measures a floating potential of the plasma generated inside the reaction chamber; and an electron emitting source that applies a negative bias voltage to the floating potential of the plasma.

SUMMARY OF INVENTION

To a plasm in a macro-scale space, such the plasma used in manufacturing processes like CVD and plasma found in nature, "Microplasma" is known as plasma in a so-called "mezzo-space", that is, a micro region or intermediate region at a boundary where there is a transition from macro-scale plasma to nano-space plasma. While the expression "microplasma" can refer to micrometer-level plasma, the term also covers plasma in a wide range of sizes from around several millimeters to around 100 μm. Microplasma of this size is comparatively easy to handle compared to a nano-sized plasma that requires special properties or special handling, and for this reason is being considered for a variety of applications. One such application is the ion source of an analyzer apparatus (device). To enable use as a stable ion source, controlling the floating potential of the plasma may be required.

One aspect of the present invention is a generating device (generation apparatus) that generates microplasma. The generating device includes: a chamber which is equipped with a dielectric wall structure and into which gas to be plasmarized flows; an RF supplying mechanism that generates the plasma inside the chamber using an electric field and/or a magnetic field through the dielectric wall structure; and a floating potential supplying mechanism that includes a first electrode disposed along an inner surface of the chamber. In this plasma generating device, high frequency is supplied from outside the chamber to generate plasma, and at the same time, on the inside of the chamber for the microplasma, the floating potential of the microplasma is controlled by surrounding at least a part of the generated microplasma by disposing an electrode along an inner surface. For intermediate-sized microplasma that is neither macro-sized nor nano-sized, the floating potential of the microplasma can be controlled by an electrode disposed so as to cover the periphery or a part of the periphery of the microplasma.

The RF supplying mechanism may include an RF field forming unit that is disposed in a first direction with respect to the chamber, and the first electrode may include an electrode disposed in a second direction with respect to the chamber. One example of the chamber is cylindrical, and the first electrode may include an electrode that is cylindrical with part of a circumferential surface missing. The dielectric wall structure may include at least one of quartz, aluminum oxide, and silicon nitride. The RF supplying mechanism may include a mechanism that generates plasma according to at least one of inductively coupled plasma, dielectric barrier discharge, and electron cyclotron resonance.

Another aspect of the present invention is a gas analyzer apparatus including: the plasma generating device described above; a sampling unit that supplies a sample gas to be measured to the chamber; an analyzer unit that analyzes the sample gas via the generated plasma; and a potential control unit that controls a floating potential of the plasma using the floating potential supplying mechanism so that the plasma flows into the analyzer unit. The analyzer unit may include: a filter unit that filters ionized gas in the plasma; and a detector unit that detects ions that have been filtered, and the floating potential control unit may keep the floating potential of the plasma at a positive potential relative to a center potential of the filter unit so that positively charged microplasma flows into the filter unit. One example of a gas analyzer apparatus is a mass spectrometer apparatus equipped with a quadrupole filter. It is possible to include a unit that controls the floating potential of the plasma so that an inflow amount changes according to an analysis result or analysis conditions of the analyzer unit. Main components of the sample gas may be analyzed with a high flow rate for a short time, or high-precision analysis may be performed at a low flow rate for a long time. The sampling unit may supply only the sampling gas to the chamber and may generate microplasma from only the sampling gas in the chamber in a state where an assist gas, such as argon, which could potentially cause noise, is not included.

Another aspect of the present invention is a process monitoring apparatus that includes the gas analyzer apparatus described above. Yet another aspect of the present invention is a control method of a gas analyzer apparatus including a plasma generating device. The method includes controlling a floating potential of the plasma with the floating potential supplying mechanism including a first electrode disposed along the inner surface of the chamber, so that the plasma flows into the analyzer unit. These methods may be provided as a program (program product) recorded on a suitable recording medium.

DESCRIPTION OF EMBODIMENTS

Figure 1:
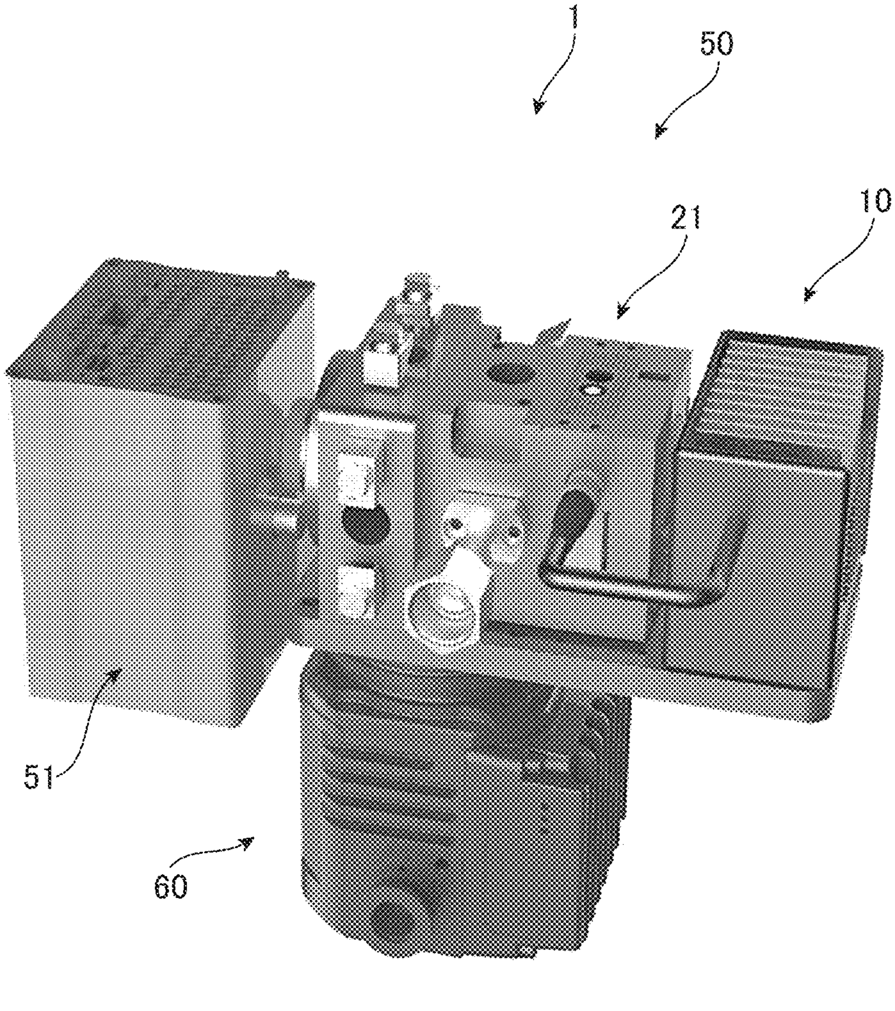
FIG. 1 depicts an overview of a gas analyzer apparatus including a plasma generating device.

FIG. 1 depicts an example of a gas analyzer apparatus including a plasma generating device (plasma generation unit). This gas analyzer apparatus (gas analyzer) 1 functions as a process monitoring apparatus (process monitor) 50 that monitors a process by analyzing sample gas supplied from the process. The gas analyzer apparatus 1 includes a plasma generation unit (plasma generator, plasma generating device) 10 that converts sample gas (sampling gas or a gas sample) from the process into plasma, an analyzer unit (analyzer) 21 that analyzes the sample gas via the generated plasma, a control unit (controller, control apparatus or control system) 51, and an exhaust system 60.

Figure 2:
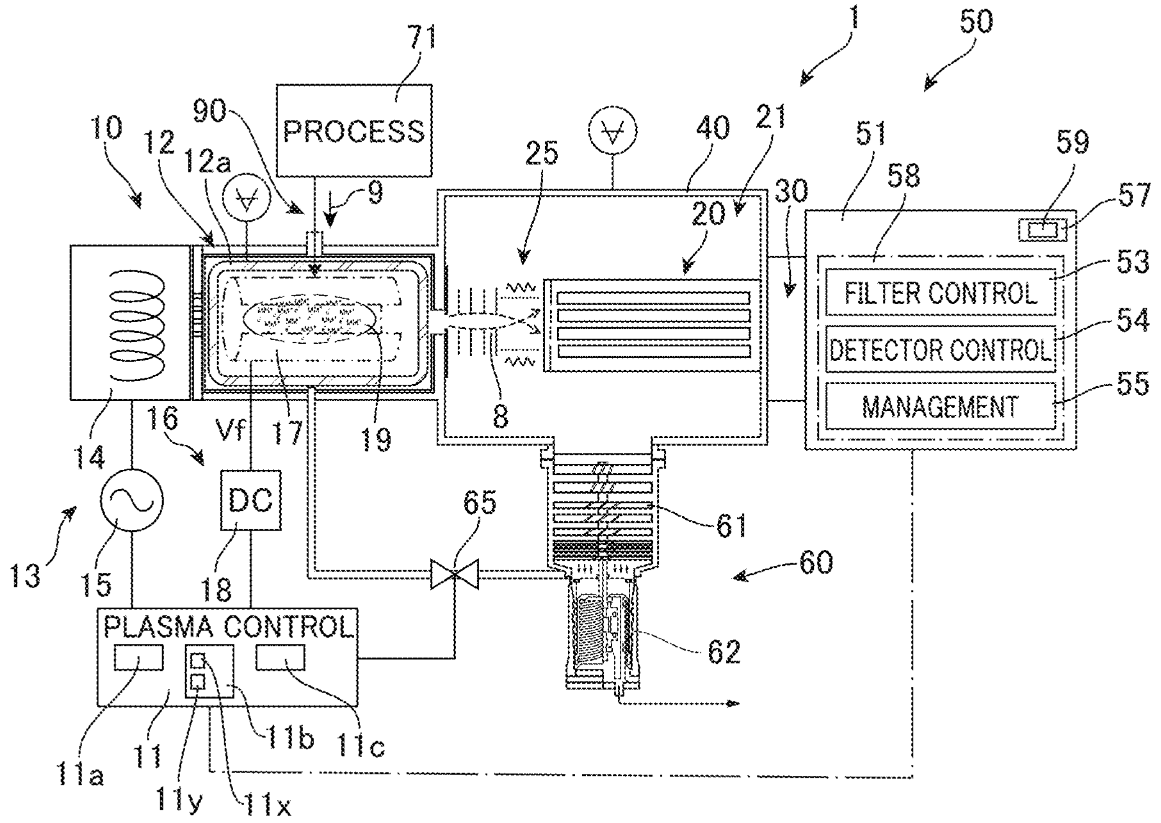
FIG. 2 depicts the configuration of a gas analyzer apparatus.

FIG. 2 depicts the configuration of the gas analyzer apparatus 1 that functions as the process monitor 50 in more detail. The gas analyzer apparatus 1 analyzes sample gas 9 supplied from a process chamber 71 in which one or more plasma processes are carried out. The plasma processes carried out in the process chamber 71 are typically one or more processes that form various types of films or layers on one or more substrates or etch the substrates, and include chemical vapor deposition (CVD) or physical vapor deposition (PVD). The plasma processes may be one or more processes that laminate various types of thin film on optical components, such as lenses or filters, as the substrates.

The process monitor 50 includes the gas analyzer apparatus 1 that analyzes the gas (sample gas) 9 supplied from the process chamber 71. The gas analyzer apparatus 1 includes the plasma generation unit (plasma generating device, plasma generation apparatus) 10 that generates plasma 19 of the sample gas 9 to be measured or monitored which has been supplied from one or more processes, a sampling unit (sampling apparatus, sampling device) 90 that supplies the sample gas 9 to be measured to the plasma generating device 10, and the analyzer unit (analyzer) 21 that analyzes the sample gas 9 via the generated plasma 19. The plasma generating device 10 includes: a chamber (sampling chamber) 12 that is equipped with a dielectric wall structure 12*a*, and receives an inflow of only the sample gas 9, which is to be measured and is supplied via the sampling apparatus 90; a high frequency supplying mechanism (RF supplying mechanism or RF supplying apparatus) 13 that applies a high frequency electric field and/or magnetic field through (via) the dielectric wall structure 12*a* to generate the plasma 19 inside the sampling chamber 12 that has been depressurized; and a floating potential supplying mechanism (floating potential control mechanism or floating potential supplying apparatus) 16 that controls the potential (floating potential) Vf of the plasma 19 using a control electrode 17 inside the sampling chamber 12.

The gas analyzer apparatus 1 according to the present embodiment is a mass spectrometer type, where the analyzer unit (analyzer) 21 includes: a filter unit (filter, in the present embodiment, a quadrupole filter) 20 that filters, according to mass-to-charge ratio, ionized sample gas (sample gas ions) 8 generated as the plasma 19 at the plasma generating device 10; a focus electrode (ion drawing optical system) 25 that draws in some of the plasma 19 as an ion flow 8; a detector unit (detector) 30 that detects the filtered ions; and a vacuum vessel (housing) 40 that houses the analyzer unit 21. The gas analyzer apparatus 1 further includes an exhaust system 60 that keeps the interior of the housing 40 under appropriate negative pressure conditions (vacuum conditions). The exhaust system 60 in the present embodiment includes a turbo molecular pump (TMP) 61 and a roots pump 62. The exhaust system 60 is a dual-type configuration that also controls the internal pressure of the sampling chamber 12 of the plasma generating device 10 using an intermediate negative pressure stage formed between the TMP 61 and the roots pump 62.

The sampling chamber 12 that has been depressurized by the exhaust system 60 receives an inflow, via the sampling apparatus 90, of only the sample gas 9 from the process chamber 71, with the plasma 19 being formed by only the sample gas 9 inside the sampling chamber 12. The chamber 12 is designed to generate microplasma in an intermediate region, which is neither macroplasma nor nanoplasma. Examples of the microplasma 19 are plasmas in a region covering sizes of around several millimeters to about 100 μm. To generate the plasma 19 of this size, the plasma generation unit 10 generates the plasma 19 for analysis purposes using only the sample gas 9 without using an assist gas (support gas), such as argon gas. The wall body 12*a* of the sampling chamber 12 is composed of a dielectric member (dielectric), and as examples is a dielectric that is highly resistant to plasma, such as quartz, aluminum oxide ($Al_2O_3$), and silicon nitride ($SiN_3$).

The sampling chamber 12 is a small chamber that is suited to generating the microplasma 19, and as one example, the sampling chamber 12 may have a total length of 1 to 100 mm and a diameter of 1 to 100 mm. The total length and diameter may be 5 mm or larger, 10 mm or larger, 80 mm or smaller, 50 mm or smaller, or 30 mm or smaller. The capacity of the sampling chamber 12 may be 1 $mm^3$ or larger, and/or $10^5$ $mm^3$ or smaller. The capacity of the sampling chamber 12 may be 10 $mm^3$ or larger, 30 $mm^3$ or larger, or 100 $mm^3$ or larger. The capacity of the sampling chamber 12 may be 104 $mm^3$ or smaller, or 103 $mm^3$ or smaller. In a space of this size, it is easy to control the potential (electric field) inside the space of chamber using the electrode 17 disposed in the chamber.

The plasma generating mechanism (RF supplying mechanism) 13 of the plasma generation unit 10 generates the plasma 19 inside the sampling chamber 12 using an electric field and/or a magnetic field applied through the dielectric wall structure 12*a* without using an electrode or using a plasma torch. One example of the RF supplying mechanism 13 is a mechanism that excites the plasma 19 with high frequency (or radio frequency (RF)) power. Inductively coupled plasma (ICP), dielectric barrier discharge (DBD), and electron cyclotron resonance (ECR) can be given as example methods used as the RF supplying mechanism 13. The plasma generation mechanism 13 that uses such methods includes a high-frequency power supply 15 and an RF field forming unit 14. A typical example of the RF field forming unit (RF field forming element) 14 includes a coil disposed along one of representative dimensions of the sampling chamber 12. As one example, if the sampling chamber 12 is cylindrical, the coil disposed along the one of respective dimensions includes a coil disposed one end face or along a radial direction.

The internal pressure of the sampling chamber (vessel) 12 is controlled to an appropriate negative pressure using the exhaust system 60 that is shared with the gas analyzer apparatus 1, an independent exhaust system, or an exhaust system that is shared with the process apparatus. The internal pressure of the sampling chamber 12 may be a pressure that facilitates generation of the microplasma 19, and as one example, is in the range of 0.01 to 1 kPa. When the internal pressure of the process chamber 71 is managed or maintained so as to be around 1 to several hundred Pa, it is sufficient to manage the internal pressure of the sampling chamber 12 to a lower pressure, for example, around 0.1 to several tens of Pa. The internal pressure may be managed to be 0.1 Pa or higher, 0.5 Pa or higher, 10 Pa or lower, or 5 Pa or lower. As one example, the inside of the sampling chamber 12 may be depressurized to about 1-10 mTorr (or 0.13 to 1.3 Pa). By keeping the sampling chamber 12 at the degree of depressurization given above, it becomes possible to generate the microplasma 19 at a low temperature using only the sample gas 9.

In the process monitor 50 (the gas analyzer apparatus 1), the monitoring target is the sample gas 9 supplied via the sampling apparatus 90 from the process chamber 71 where the plasma process is carried out. Inside the sampling chamber 12, by supplying RF power under appropriate conditions, it is possible to maintain the plasma 19 by merely introducing the sample gas 9 without using arc discharge or a plasma torch. By eliminating the need for a support gas such as argon gas, it is possible to generate the ionized plasma 19 with only (merely, simply) the sample gas 9 and supply the ionized plasma 19 to the gas analyzer unit 21. This means that it is possible to provide the gas analyzer apparatus 1 which has high measurement accuracy for the sample gas 9 and is also capable of quantitative measurement of components that are not limited to gas components. As a result, in the process monitor (process monitoring apparatus) 50 equipped with the gas analyzer apparatus 1, it is possible to stably and accurately monitor the internal state of the process chamber 71 of the process apparatus over a long period of time.

In addition, to enable the gas analyzer apparatus 1 to acquire measurement results for stable and accurate monitoring over a long period of time, it is also important to generate the plasma 19 inside the sampling chamber 12 with a stable floating potential Vf or charging voltage. By controlling the floating potential of the plasma 19 in the gas analyzer apparatus 1, it is possible to perform measurement more stably.

In the process monitor 50, the plasma 19 of the sample gas 9 is generated by the sampling chamber 12 that is independent of the process chamber 71 and is dedicated to analysis of gases. Accordingly, the microplasma 19 can be generated in the sampling chamber 12 under conditions that are suited to sampling and gas analysis and differ to the conditions in the process chamber 71. As one example, the internal state of the process chamber 71 can be monitored by converting the sample gas 9 into plasma (by plasmarized sample gas) even when no process plasma or cleaning plasma is being generated in the process chamber 71. The sampling chamber 12 may be a small chamber (miniature chamber) with a size of several millimeters to several tens of millimeters, for example, which is suited to generating the microplasma 19. Due to the small capacity of the sampling chamber 12, the entire analyzer apparatus 1 can be made compact and lightweight and it is possible to provide a gas analyzer apparatus 1 that is suited to real-time measurement. The gas analyzer apparatus 1 may be a portable or a handy type device.

The floating potential supplying mechanism (supplying apparatus or floating potential control mechanism) 16 that controls the potential (floating potential) of the plasma 19 includes a cylindrical control electrode 17 disposed along the inner surface of the sampling chamber 12 and a DC power supply 18 that controls the potential of the control electrode 17. The control electrode 17 may have a cylindrical shape where one part of the circumferential surface is omitted (missing, cut off), and is capable of suppressing the generation of eddy currents. If corrosiveness of the sample gas 9 does not pose a problem, the control electrode 17 may use a metal, such as stainless steel, nickel, or molybdenum. However, in view of corrosion resistance for the sample gas 9, a corrosion-resistant conductive material such as the corrosion-resistant material Hastelloy, tungsten, titanium, or carbon (graphite) may be used.

The sampling chamber 12 may be cylindrical. In this plasma generation unit 10, for a sampling chamber 12 that is cylindrical, the RF field forming unit 14 is disposed along one end surface, for example, in a radial direction (first direction) that is perpendicular to a central axis direction (second direction) that crosses the sampling chamber 12, and the electrode (first electrode) 17 that controls the floating potential Vf is disposed along the inner cylindrical surface extending in the direction with circumferential (second direction) of the chamber 12 in parallel with the central axis direction (second direction). With this configuration, an RF field for forming the plasma 19 is supplied by the RF field forming unit 14 that is disposed facing an opening at one end or both ends of the cylindrical control electrode 17 that controls the floating potential. As a result, interference between the field that generates the plasma 17 and the field that controls the floating potential of the plasma 19 can be suppressed, the plasma 19 can be stably generated, and it is easy to control the floating potential as well.

The electrode (first electrode) 17 for controlling the floating potential Vf may have a cylindrical shape, a shape where one part of a cylinder is omitted (cut off), a semi-cylindrical shape, or may be a combination of flat surfaces (flat plates). Due to the RF field supplied by the RF field forming unit 14, the microplasma 19 is formed so as to float in a region surrounded by the first electrode 17, which makes it easy to control the potential of the microplasma 19 using the first electrode 17. In particular, with a suitable size for the microplasma 19 (that is, a size of a space where the microplasma 19 is generated), by disposing the electrode 17 and the RF field forming unit 14 in a perpendicular arrangement and supplying the RF field from one end or both ends of the electrode 17, it is possible to generate the plasma 19 inside the cylindrical or cylindrical like electrode 17. While the arrangement of the electrode 17, which controls the floating potential Vf, and the RF field forming unit 14 is not limited to the arrangement given above, placing the two units perpendicular to each other suppresses mutual interference, efficiently generates the plasma 19, and at the same time is suited to controlling the floating potential (floating voltage) Vf of the generated plasma 19.

The control unit (control apparatus) 51 of the analyzer unit 21 may also serve as the control unit of the analyzer apparatus 1 which is the process monitoring apparatus 50. The control apparatus (controller) 51 includes a filter control unit (filter control function, filter controller or filter control apparatus) 53 that controls the filter unit (filter) 20, a detector control unit (detector control function, detector controller or detector control apparatus) 54 that controls the detector unit (detector) 30, and a management control apparatus (management apparatus, management controller, manager, management function, or management unit) 55. The control unit 51 may have computer resources including a memory 57 and a CPU 58, and the functions of the control unit 51 may be provided by a program 59 recorded in the memory 57. The program (program product) 59 may be provided by recording the program on a suitable recording medium.

The analyzer unit 21 in the present embodiment is a type of mass spectrometer, and more specifically a quadrupole mass spectrometer, and the filter unit 20 is a quadrupole filter. The filter control unit 53 includes a function as a driving unit (driver, RF/DC unit) that applies a high frequency current and direct current to the quadrupole. The filter unit 20 filters the ionized sample gas (ion flow) 8 supplied as the microplasma 19 based on the mass-to-charge ratio. The detector control unit 54 includes a function that detects the components contained in the sample gas 9 by capturing the ion currents generated in the detector unit (detection unit, collector unit, or detector) 30, as one example, a Faraday cup, by the ions that have passed through the filter unit 20.

The management control apparatus (management control unit) 55 controls the measurement (detection) mode executed by the analyzer unit 21. The measurement modes include modes such as: (i) a mode where the main components contained in the sample gas 9 are measured in a short time; (ii) a mode in which all of the components contained in the sample gas 9 are measured over a comparatively long time; (iii) a mode that detects one or a plurality of specific components in the sample gas 9; and (iv) a mode where a test gas whose components are known is supplied as a sample gas. In the mode iv, the components of the sample gas are detected in a predetermined mode, and the settings of the filter unit 20 and the detector unit 30 are changed or corrected and/or the measurement results are calibrated. The management control unit 55 may have a function that is capable of controlling the amount (inflow amount) of the plasma 19 that flows into the analyzer unit 21 as the ion flow 8 and/or requesting a change to the floating potential Vf of the plasma 19 so as to control the inflow amount when it is not possible, due to the ratio of the component to be measured being too high or too low, to obtain a measurement result in a range where the detector 30 has an appropriate sensitivity.

The plasma generation control unit (plasma generation control apparatus, generation controller or generation control apparatus) 11 that controls the plasma generation unit 10 may be a programmable control apparatus and may have a function (RF control unit) 11*a* that controls the frequency, voltage, and the like of the high frequency power supply 15 for generating the plasma 19 in the sampling chamber 12 and a function (plasma potential control unit, potential control apparatus, potential controller or voltage control apparatus) 11*b* that controls the voltage supplied to the control electrode 17 of the floating potential supplying mechanism 16. The plasma generation control unit 11 may have a function 11*c* that controls the internal pressure of the sampling chamber 12 using a pressure control valve 65 provided on a line connecting to the exhaust system 60. By controlling these factors, it is possible to stably generate the plasma 19 inside the sampling chamber 12, even when the type of process carried out in the process chamber 71 has changed and/or the state of the process changes based on a request from the control unit 55 of the management apparatus 51 of the analyzer unit 21. Accordingly, the process monitoring apparatus 50 that includes the analyzer apparatus 1 can continuously analyze the sample gas 9 and monitor one or more processes.

The potential control unit 11*b* controls the floating potential Vf of the plasma 19 via the first electrode 17 disposed along the inner surface of the chamber 12 so that the plasma 19 flows from the chamber 12 into the analyzer unit 21 as the ion flow 8. When detecting and measuring positive ions in the plasma 19 of the sample gas 9, a voltage is supplied or set to the control electrode 17 so that the plasma potential (floating potential) floats to the positive side (plus potential or positive potential) by around +5 to 15V with respect to the center potential of the quadrupole electric field. By keeping the floating potential Vf of the plasma 19 at a positive potential with respect to the center potential of the filter unit 20, it becomes easier to supply the plasma 19, that is, positive ions to be detected, to the filter unit 20, which makes highly accurate detection or measurement possible.

As one example, to reduce noise due to the detection of stray ions and stray electrons, the center potential of the quadrupole is applied or set at +10V or higher when detecting positive ions, and as one example, around +10V to 100V. When it is necessary to measure negative ions, the floating potential of the plasma 19 that is the ion source may be negatively biased with respect to the ground potential, with the Faraday cup of the detector unit 30 set at the ground potential.

The potential control unit 11*b* includes a first control unit (first controller, control apparatus) 11*x* that sets the floating potential Vf so as to maintain a reference potential V0 with a predetermined potential difference ΔV, which is set in advance, with respect to the center potential of the filter unit 20 and a second control unit (second controller, control apparatus) 11*y* that causes the floating potential Vf to vary up and/or down relative to the reference potential V0 so that the amount of the plasma 19 flowing into the analyzer unit 21 changes according to the analysis result or analysis conditions of the analyzer unit 21. That is, the potential control unit 11*b* is configured to maintain the floating potential Vf at a reference potential V0 with a predetermined potential difference ΔV, which is set in advance, with respect to the center potential of the filter unit 20, and in response to a request, causes the floating potential Vf to vary or change up or down with respect to this reference potential V0 to change the amount of the plasma 19 that flows into the analyzer unit 21 according to the analysis result or analysis conditions of the analyzer unit 21.

As one example, if the management control unit 55 is set in the mode where the analyzer unit 21 measures the main components contained in the sample gas 9 in a short time, the potential control unit 11*b* is capable of using the second control function 11*y* to change the floating potential Vf with respect to the reference potential V0 in a direction where the potential difference increases to create a large voltage gradient relative to the analyzer unit 21, thereby expanding or increasing the inflowing amount of the plasma 19. On the other hand, when the management control unit 55 is set in the mode where all of the components contained in the sample gas 9 are measured over a comparatively long period of time, the potential control unit 11*b* is capable of using the second control function 11*y* to change the floating potential Vf with respect to the reference potential V0 in a direction where the potential difference decreases to reduce the voltage gradient relative to the analyzer unit 21, thereby reducing the amount of the plasma 19 flowing into the analyzer unit 21. When the ratio of a component to be measured is too high or too low and this prevents a measurement result from being obtained within a range where the detector 30 has appropriate sensitivity, the management control unit 55 may request the potential control unit 11*b* to set the floating potential Vf so as to create an appropriate voltage gradient between the plasma 19 inside the chamber 12 and the analyzer unit 21, with the potential control unit 11*b* controlling the potential of the electrode 17 to set the plasma 19 at the appropriate floating potential Vf.

Figure 3:
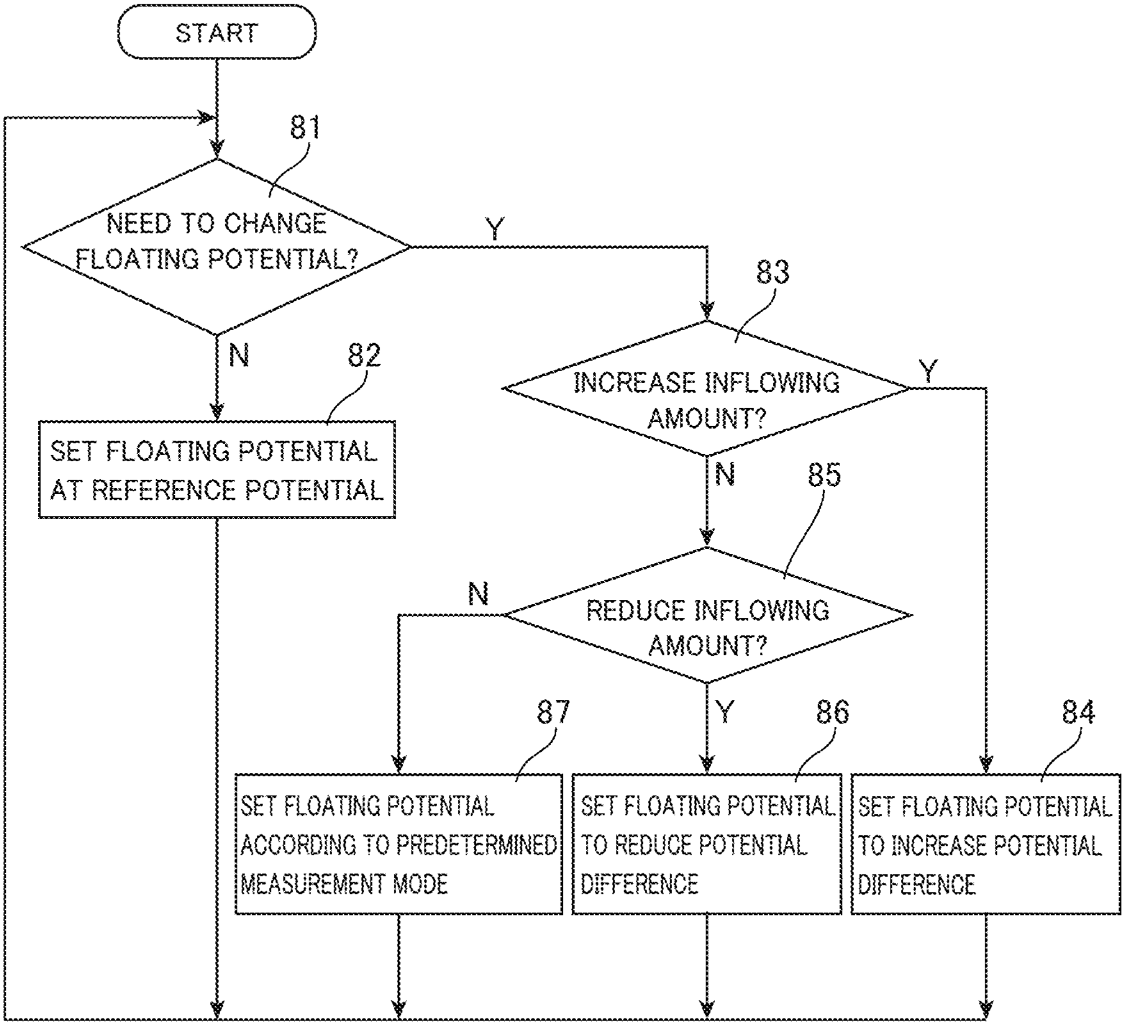
FIG. 3 is a flowchart depicting an overview of control of a plasma floating potential in a gas analyzer apparatus.

FIG. 3 depicts an overview of a control method for the floating potential Vf of the plasma generation unit (plasma generating device) 10 in the analyzer apparatus 1 by way of a flowchart. In step 81, when the potential control unit 11*b* has not received a request to change the floating potential Vf, in step 82, the reference potential V0 that has been set in advance, as one example, any value in a range of around +5 to 15V relative to the center potential of the quadrupole electric field, is set. When there is a request to change the floating potential Vf from the management control unit 55 of the analyzer unit 21 or the like, the floating potential Vf is changed according to the request. As one example, when, in step 83, there is a request for an increase in the inflow amount of the microplasma 19 that flows as the ion flow 8 into the filter 20 of the analyzer unit (analyzer) 21, in step 84, the floating potential Vf is set (varied, changed) in a direction where the potential difference increases (expands or opens up), as one example, at a high potential. When, in step 85, there is a request for a decrease (reduction) in the inflow amount of the plasma 19, in step 86, the floating potential Vf is set (changed) in a direction where the potential difference decreases (falls), as one example, at a low potential. When for example there is a request from the management control unit 55 that involves a change of mode, such as short-time measurement or precision measurement, instead of a request indicating the inflow amount, in step 87, a predetermined floating potential Vf suited to the designated measurement mode is set.

The control method described above is merely one example, and since the plasma generating device 10 is equipped with the potential control mechanism (potential supplying mechanism or potential supplying apparatus) 16 including the electrode 17 that is disposed inside the chamber 12 and controls the floating potential, it is possible to freely adjust the potential of the microplasma 19 supplied from the chamber 12 according to a request from an application that uses the plasma generating device 10.

Note that to prevent the detection of noise components due to extra stray electrons (that are negatively charged), the filter unit (mass spectrometer) 20 and the detector unit (Faraday cup) 30 may be surrounded by shields, such as simple pipes. Also, although a quadrupole-type mass spectrometer apparatus has been described above as an example, the filter unit 20 may be an ion trap, or another type of device, such as a Wien filter. The filter unit 20 is not limited to a mass spectrometer, and may be a filter that filters molecules or atoms of gas using other physical quantities, such as ion mobility. The gas analyzer unit may be an optical analyzer apparatus, such as an optical emission spectrometer. Although an example used as a gas analyzer apparatus has been described as one example of a plasma generating device, microplasma is not limited to the analysis of gases, and use in a wide variety of applications, such as microfabrication and inactivation of bacteria in healthcare, is currently being studied, with the present invention also effective in such applications.

Although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. A gas analyzer apparatus configured to analyze a sampling gas supplied from a process chamber in which one or more plasma processes are carried out, the gas analyzer comprising:

a sample chamber which is equipped with a dielectric wall structure and into which the sampling gas flows;

an RF supplying mechanism that is configured to generate the plasma inside the sample chamber using an electric field or a magnetic field through the dielectric wall structure; and a floating potential supplying mechanism that includes a first electrode disposed along an inner surface of the sample chamber and configured to control a potential of the plasma in the sample chamber independently of the process chamber.

2. The gas analyzer apparatus according to claim 1, further comprising a sampling route that is configured to supply the sampling gas to the sample chamber from the process chamber, wherein the sampling route supplies only the sampling gas to the sample chamber and the plasma is generated inside the sample chamber using only the sampling gas.

3. The gas analyzer apparatus according to claim 1, wherein the RF supplying mechanism is configured to generate the plasma inside the sample chamber using an electric field and a magnetic field through the dielectric wall structure.

4. The gas analyzer apparatus according to claim 1, wherein the RF supplying mechanism is configured to generate the plasma inside the sample chamber using an electric field through the dielectric wall structure.

5. The gas analyzer apparatus according to claim 1, wherein the RF supplying mechanism is configured to generate the plasma inside the sample chamber using a magnetic field through the dielectric wall structure.

6. A process monitor comprising the gas analyzer apparatus according to claim 1.

7. The process monitor according to claim 6, wherein the process monitor is configured to monitor one or more of the following processes being carried out in the process chamber: a process of forming films or layers on substrates using chemical vapor deposition (CVD) or physical vapor deposition (PVD) and a process of etching the substrates.

8. A method for monitoring one or more plasma processes to be carried out in a process chamber using a gas analyzer apparatus that is configured to analyze a sampling gas supplied from the process chamber, wherein the gas analyzer comprises:

a sample chamber into which the sampling gas flows;

an RF supplying mechanism that is configured to generate the plasma inside the sample chamber using an electric field or a magnetic field through a dielectric wall structure of the sample chamber; and a first electrode disposed along an inner surface of the sample chamber, the method comprises controlling a potential of the plasma in the sample chamber independently of the process chamber using the first electrode.

9. The method according to claim 8, wherein the plasma processes to be carried out in the process chamber to be monitored includes at least one of a process of forming films or layers on substrates using chemical vapor deposition (CVD) or physical vapor deposition (PVD) and a process of etching the substrates.

10. The method according to claim 8, wherein the RF supplying mechanism is configured to generate the plasma inside the sample chamber using an electric field and a magnetic field through the dielectric wall structure.

11. The method according to claim 8, wherein the RF supplying mechanism is configured to generate the plasma inside the sample chamber using an electric field through the dielectric wall structure.

12. The method according to claim 8, wherein the RF supplying mechanism is configured to generate the plasma inside the sample chamber using a magnetic field through the dielectric wall structure.

* * * * *